United States Patent [19]
Gilberg et al.

[11] 3,752,958
[45] Aug. 14, 1973

[54] FIELD DETECTION LOGIC

[75] Inventors: Robert C. Gilberg, Dayton; James P. Donohue, Fairborn; Ramesh S. Patel, Kettering, all of Ohio

[73] Assignee: The National Cash Register Company, Dayton, Ohio

[22] Filed: Dec. 7, 1971

[21] Appl. No.: 205,542

[52] U.S. Cl. 235/61.11 E, 340/146.3 K, 340/146.3 B
[51] Int. Cl. ............................................. G06k 7/12
[58] Field of Search................. 238/92 CC, 61.11 E; 340/146.3 B, 146.3 K

[56] References Cited
UNITED STATES PATENTS

| | | | |
|---|---|---|---|
| 3,617,704 | 11/1971 | Kapsambelis................. | 235/61.11 E |
| 3,558,862 | 1/1971 | McMillan..................... | 235/61.11 E |
| 3,562,494 | 2/1971 | Schmidt........................ | 235/61.11 E |
| 3,671,722 | 6/1972 | Christie......................... | 340/146.3 K |

Primary Examiner—Maynard R. Wilbur
Assistant Examiner—Robert F. Gnuse
Attorney—J. T. Cavender, Harry W. Barron et al.

[57] ABSTRACT

A system for processing a color bar code read optically from a coded medium is disclosed. The system includes logic for determining the binary code from color signals and storage means for temporarily storing the binary code. Logic is also provided which allows the reading of a double field tag and which checks the parity and the size of the captured message. Further, logic is provided for transmitting the captured message to a utilization device.

11 Claims, 30 Drawing Figures

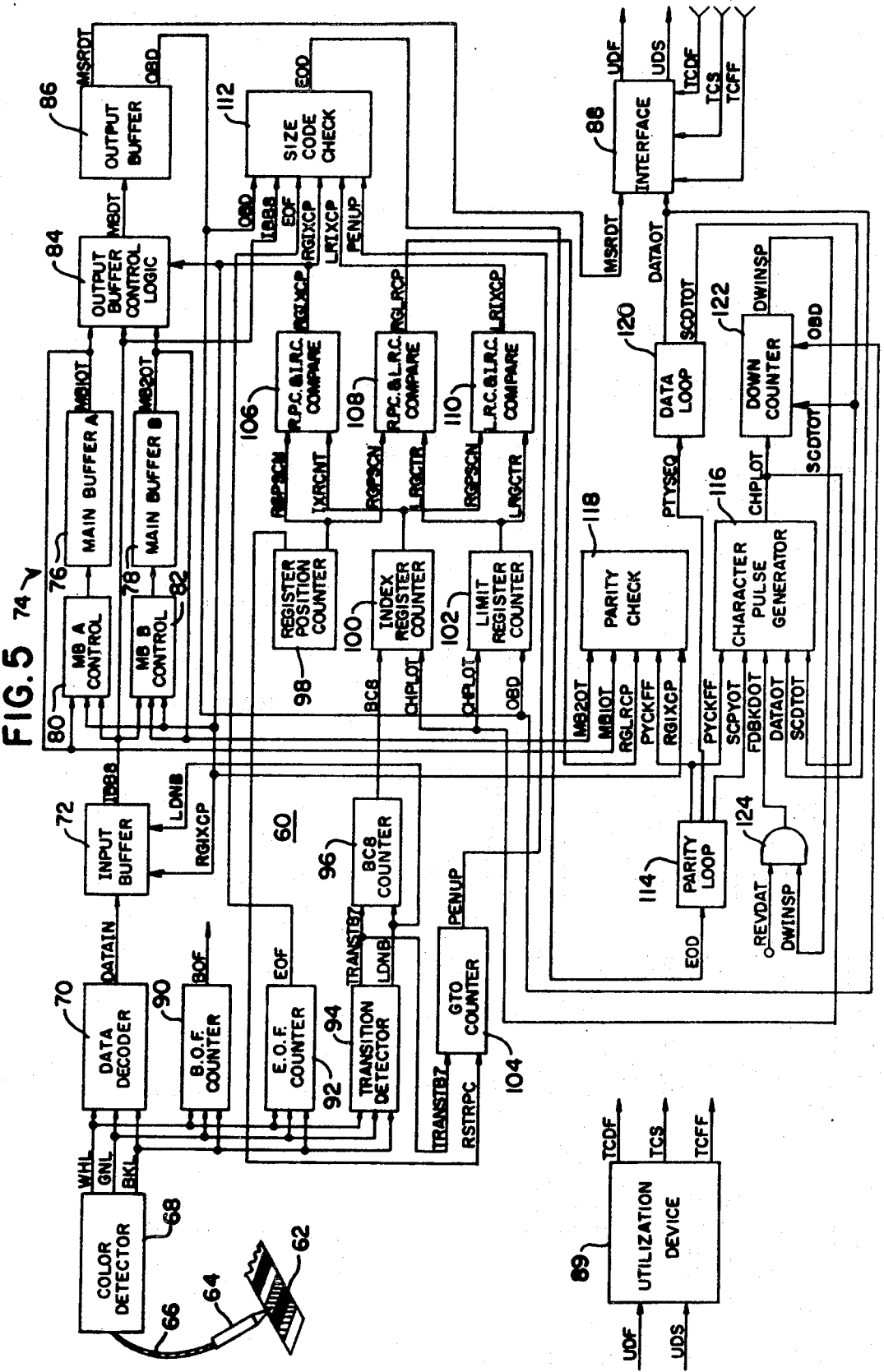

ન3,752,958

FIELD DETECTION LOGIC

This invention relates to code detecting apparatus and more particularly to apparatus for detecting the code manifested by a series of three or more colored bars placed contiguously along a given path.

In today's world of business, it has become necessary to automatically input information into a desired business machine. To effect this desire, a compact code is attached to a medium and scanned by appropriate reading apparatus. The medium may, for instance, be a retail price tag, a credit card, a bank ledger card, or any other desired item useful for containing information. The coded information may include the price and the article inventory number in case of a retail price tag, or an account number in the case of a credit card or bank ledger card.

One type of code utilizes a series of contiguous colored bars of three or more different colors where each bar has a bar of a different color on each side thereof. The Transition from one color to another color in this code represents a binary bit, and the binary bits of all transitions represent the desired information. The binary bits may be grouped by fours so that each group represents one decimal number. A more complete description of this code is given in U.S. Pat. application Ser. No. 837,850, filed June 30, 1969, by John B. Christie, now U.S. Pat. No. 3,671,722 and a reader for this code is described in U.S. Pat. application Ser. No. 837,514, filed June 30, 1969, by John B. Christie, Dzintars Abuls, and Wilfridus G. van Breukelen, now U.S. Pat. No. 3,637,993 both of which applications are assigned to the present assignee.

When a coded tag is being used, it is essential that the encoded information be accurately read. In this regard, the tag includes size code and parity information which is read by reading apparatus. Thereafter, logic in the reading apparatus checks the data against the size code and parity information to insure that the data is accurate.

For this logic to properly operate, it is necessary to know at what point in time the detecting apparatus is detecting the actual coded information, and not background colors in the area. Otherwise false bits of information would be captured.

Background of the Invention

In accordance with one preferred embodiment of this invention, there is provided in a code reading system in which scanning means scan a coded medium along a given path that includes a plurality of contiguous detectable indicia arranged in a coded format, each indicia having one of at least three detectably different characteristics, the code being defined by transitions from an indicium of one characteristic to an indicium of a different characteristic, the first detected and last detected indicium being detected for a longer time than the remaining indicia, logic for determining when said plurality of indicia are being scanned. This logic includes means to determine the time each of said indicia is detected, means to provide a first signal whenever the time for detecting a certain indicium is a certain amount less than the time for detecting the immediately preceding indicium, and means to provide a second signal whenever the time for detecting a second

Brief Description of the Drawings

The subject matter of the invention is pointed out and distinctly claimed in the concluding portion of the specification. The invention, however, both as to its organization and method of operation may best be understood by reference to the following description taken in conjunction with the accompanying drawings, in which:

FIG. 5 shows a general block diagram of the reading apparatus for reading the color bar tags shown in FIGS. 1A and 1B.

It will be noted that the figures are numbered to correspond to the numbering of the figures of the Gilberg et al. U.S. Patent No. 3,717,750, referenced below.

Description of the Preferred Embodiment

Figure 1A:
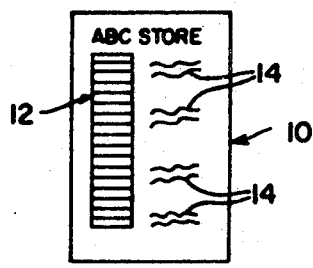
FIG. 1A shows a single field color bar tag.

Referring now to FIG. 1A, there is shown a typical single field tag 10 which can be used in a retail store. Tag 10 includes data field 12 consisting of a plurality of colored bars placed contiguous to one another. The bars may be of three different colors, such as green, black, and white, and the background color of tag 10 may be white. In practice, the data field is printed by printing the green and black bars and leaving a space for the white bars. A printer for printing the tag 10 is described in U.S. Pat. application Ser. No. 51,073, filed June 30, 1970, by Donald E. Landis and entitled "Color Bar Printer." Tag 10 also includes several series of human readable printing 14, which manifests the essential information contained in the data field 12. This is provided so that the customer knows the price and also so that the information can be entered manually in the event of an equipment breakdown.

Figure 1B:
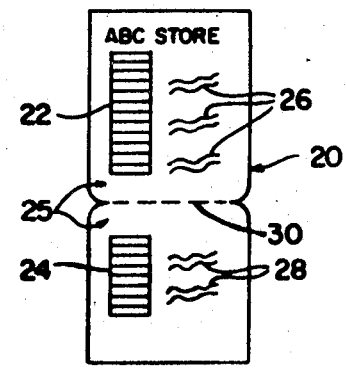
FIG. 1B shows a double field color bar tag.

FIG. 1B shows a typical double field tag 20, which includes two color bar coded data fields 22 and 24 separated by an area 25. Data field 22 may include inventory control information such as department number, class number, stock keeping unit (s. k. u.) number, size, color, and so forth. This information is printed as human readable printing 26 to the side of data field 22. Data field 24 may include the price information, which is manifested by human readable printing 28. Data field 24 and printing 28 can be detached from tag 20 along perforations 30 in the event of a price change, and a new data field and associated printing manifesting the new price can be affixed to complete tag 20 with the proper price information, or the price may be inserted manually, if desired.

Data fields 12, 22, and 24 may be scanned with a pen-like device which is described in detail in the above-noted Christie et al. United States patent application and which provides a signal indicative of the color of the bar then being scanned. These color signals are processed by logic circuitry to obtain the desired information, which is then transmitted to a utilization device, such as the retail sales terminal described in U.S. Pat. application Ser. No. 71,971, filed Sept. 14, 1970, by James E. Zachar and Walter E. Strode, Jr., now United States Patent 3,686,637, and entitled "Retail Terminal," which is assigned to the present assignee.

Figure 2A:
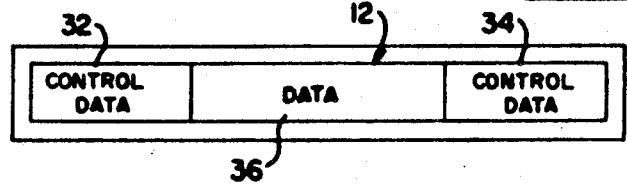
FIG. 2A shows the general layout of a single field tag.

Referring now to FIG. 2A, there is shown the general coded layout of data field 12 of single field tag 10. Data field 12 includes front and back control data portions 32 and 34 and data portion 36. Front control data portion 32 includes a single direction bit, a four bit size code, and a two bit tag identification code. Back control data portion 34 includes a single direction bit, a four bit size code, a two bit MOD3 parity code, and a four bit block check code (B. C. C.) parity code. Data portion 36 may contain from 2 through 28 (even numbers only) four bit binary coded decimal (B. C. D.) characters.

Figure 2B:
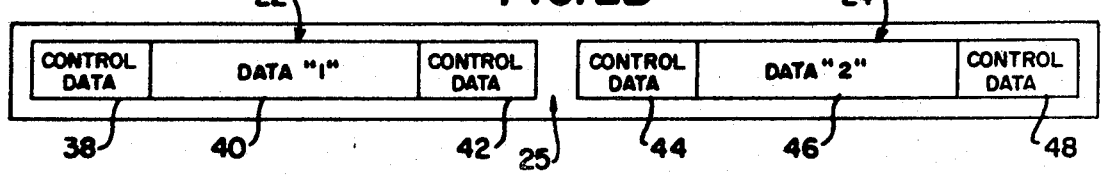
FIG. 2B shows the general layout of a double field tag.

FIG. 2B shows the general coded layout of the data fields 22 and 24 of double field tag 20. Data field 22 contains front control data portion 38, data 1 portion 40, and back control data portion 42, and data field 24 contains front control data portion 44, data 2 portion 46, and back control data portion 48. Area 25 is between back control data portion 42 and front control data portion 44. Front control data portions 38 and 44 contain a single direction bit, a four-bit size code, and a two-bit identification code. Back control data portions 42 and 48 contain a single direction bit, a four-bit size code, a two-bit MOD3 parity code, and a four-bit B. C. C. parity code. Data 1 portion 42 and data 2 portion 46 contain from 2 to 28 (even numbers only) four-bit B. C. D. characters.

Figure 3:
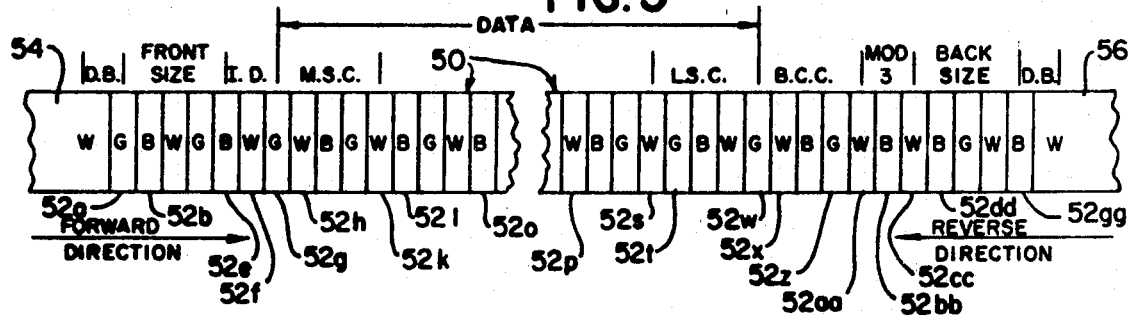
FIG. 3 shows a specific layout of the color bars in a field of a color bar tag.

FIG. 3 shows an example of a data field 50, which includes a plurality of individual color bars 52a–52gg each contiguous with one another. Field 50 may be either field 12 or one of fields 22 or 24. Each of the bars 52 is labeled either W, G, or B to indicate whether they are a respective white, green, or black bar. On the left and right of data field 50 are larger white areas 54 and 56, which are part of the background of the tag. If field 50 is one of the fields of a double field tag, one of the areas 54 or 56 will be area 25 shown in FIGS. 1B or 2B. The colors of the bars 52a–52gg are so arranged that no bars of the same color are adjacent to each other.

In coded tags, such as those shown in FIGS. 1 through 3, it is desirable that the coding be capable of being scanned in either direction; that is, from top to bottom, or from bottom to top, in the case of FIG. 1, and from right to left or from left to right in the case of FIGS. 2 and 3. To accomplish this in the code of FIG. 3, the leftmost bar 52a is green, and the rightmost bar 52gg is black. A forward direction scan is defined when data field 50 is scanned from green bar 52a to black bar 52gg (left to right in FIG. 3), and a reverse direction scan is defined when data field 50 is scanned from black bar 52gg to green bar 52a (right to left in FIG. 3). Logic within the reader (to be hereinafter explained in detail) will look at the first binary bit detected and provide a signal indicative of the direction scanned.

Figure 4A:
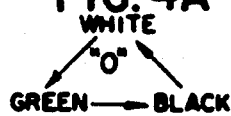
FIGS. 4A and 4B show code detecting charts.
Figure 4B:

Before a discussion of the coding layout of FIG. 3 in detail, it is necessary to understand the code itself. For this, reference is made to FIGS. 4A and 4B, where two code decipher charts are shown. The color bar code is a transition code; that is, the transition from one color to another color represents a binary digit (bit) of either 1 or 0. Specifically, as shown by FIG. 4A, transitions from white to green, green to black, and black to white represent 0 bits, and, as shown by FIG. 4B, transitions from white to black, black to green, and green to white represent 1 bits.

Referring again to FIG. 3, it is seen that the first transition in a forward direction scan is from white background area 54 to green bar 52a, and this represents a 0 bit. On the other hand, the first transition in a reverse direction scan is from white background area 56 to black bar 52gg, and this represents a 1 bit. Since the first bar 52a will always be green and the last bar 52gg will always be black, the first bit detected represents the direction of the scan. It should be noted that the bit values determined in a reverse scan will be in opposite order and the complement of the bit values obtained while scanning in the forward direction. For instance, the last bit detected in a forward direction scan will be a 0 bit due to the black bar 52gg to white background area 56 transition, whereas this transition occurs first and represents a 1 bit for a reverse direction scan.

For brevity hereinafter with respect to FIG. 3, the coding format of data field 50 will be described as being scanned in the forward direction, it being understood that for a reverse direction scan oppositely ordered complementary bits are provided. Bars 52b–52e form the front size code and are selected so that the transitions to those bars will give the complement of one more than the number of eight-bit characters in the data portion, with the most significant bit of the front size code being scanned first. It should be noted that each eight-bit character includes two four-bit B. C. D. digits. Thus, the number of four-bit B. C. D. characters will be (2N−2), where N is the size code number which is defined by the complement of the front size code.

The bars 52f and 52g form an identification code (I. D.) to indicate whether a single field tag, such as the tag 10, or a double field tag, such as the tag 20, is being scanned. If the transitions to these bars produce the binary code 0—0, a single field tag is being scanned; if the transitions to these bars produce the binary code 0–1 (most significant digit first), the first data field of a double field tag is being scanned; and if the transitions to these bars produce the binary code 1—1, the second data field of a double field tag is being scanned. For a reverse direction scan, these binary codes will be reversed and complemented.

Next, the data contained in the data field is scanned by determining the transitions to bars 52h through 52w. As previously mentioned, each four successive bars constitute a B. C. D. character, and there are (2N−2) B. C. D. characters of data, where N is the number in the size code, arranged most significant character first, with each B. C. D. character being arranged least significant bit first.

After the data of the data field 50 is detected, bars 52x–52aa are scanned, and the transitions to these bars provide the four-bit B. C. C. parity code. The B. C. C. parity code is determined by adding the 1 bits in each significant position of each B. C. D. character, and dividing this sum by two, the remainder being the B. C. C. code. For example, for the four B. C. D. characters 0-1-0-0, 0-0-1-1, 1-0-0-1, and 0-1-1-0 (least significant digit first), the B. C. C. code is calculated as follows: 3

0–1–0–0
0–0–1–1
1–0–0–1

| | 0-1-1-0 |
|---|---|
| adding the "1" bits | 1 2 2 2 |
| dividing each sum by 2 | ÷ 2 |
| quotient | 0 1 1 1 |
| remainder (B. C. C.) | 1 0 0 0 |

Thus, the B. C. C. Parity code is 1-0-0-0.

After the B. C. C. parity code has been detected, a two-bit MOD3 parity code is detected by finding the transition to bars 52bb and 52cc. These two bits will insure that the last bar 52gg will be black in addition to affording a second parity check. The MOD3 parity code is determined by counting the total number of 1 bits and 0 bits in the entire data field, excluding the MOD3 parity code, dividing each of these sums by 3, and adding a sufficient number of 1 bits as the MOD3 parity code to make the remainders equal. For example, if in a data field there are 20 1 bits and 12 0 bits, the MOD3 code is calculated as follows:

divide 0 total by 3 : 20/3 = 6, remainder 2
divide 1 total by 3 : 12/3 = 4, remainder 0
remainder difference: 2

Thus, two 1 bits are needed to make the remainders equal, so the MOD3 parity code will be 1—1.

Following the MOD3 parity code is the back size code, which is determined by the transition to bars 52dd through 52gg. In the case of the back size code, the true values of the bits are scanned, least significant bit first. Thus, the back size code is in opposite order and complementary to the front size code. This results in the second through fifth bits of the code being the same regardless of whether the data field is scanned in a forward or a reverse direction. The final bit in the data field 50 will be the direction bit defined by the transition from bar 52gg to background area 56, and this will be the same as the original direction bit defined by the transition from background area 54 to bar 52a.

Referring now to FIG. 5, a generalized block diagram of the Color Bar Reader 60 is shown. A color bar field 62 is scanned by an optical pen-shaped probe 64. Light rays indicative of the color then being scanned are transmitted through a fiber optic bundle 66 to Color Detector Circuit 68. Color Detector Circuit 68 provides three pulse shaped signals which indicate the color then being scanned. If a white color bar is scanned, the WHL signal is a logic 0 signal, and the GNL and BKL signals are logic 1 signals. Similarly, if a respective green or black color bar is being scanned, the respective GNL or BKL signals are logic 0, and the other two signals are logic 1 signals. A detailed description of the probe 64, the fiber optic bundle 66, and the Color Detector Circuit 68 is given in the above-mentioned Christie et al. United States patent application.

The three color signals WHL, GNL, and BKL are applied to Data Decoder Means 70, which provides a DATAIN signal, which is the binary coded signal of the code in data field 62. The DATAIN signal is applied to Input Buffer Means 72, and, after eight bits have been applied thereto, the RGIXCP signal becomes logic 1 and causes the eight bits in Input Buffer Means 72 to be transferred as the IBB8 signal to character position one of the Main Buffer Means 74.

Main Buffer Means 74 includes a 136-bit Main Buffer A 76 and a second 136-bit Main Buffer B 78, each of which has respective control circuits MBA Control Means 80 and MBB Control Means 82 associated therewith. For a single field tag, or the first scanned field of a double field tag, the information detected is stored in Main Buffer A 76, and, for the second scanned field of a double field tag, the information detected is stored in Main Buffer B 78. The term first scanned field is defined to be data field 22 in FIG. 2B for a forward direction scan and data field 24 for a reverse direction scan. The term "second scanned field" is defined to mean field 24 for a forward direction scan and field 22 for a reverse direction scan.

Upon command of the RGIXGP signal, an eight-bit character is shifted from Main Buffer Means 74 through Output Buffer Control Logic 84 and Output Buffer Means 86 to Interface Means 88. Interface Means 88 interfaces the Reader 60 with an appropriate Utilization Device 89, such as the Terminal Control Unit shown in the above-cited Zachar et al. United States patent application and further described in U.S. Pat. application Ser. No. 72,084, filed Sept. 14, 1970, by Ralph D. Haney et al. now U.S. Pat. 3,702,988, and entitled "Digital Processor," which is assigned to the present assignee. Before Interface Means 88 transmits any data to Utilization Device 89, the data must be checked to insure its accuracy. For this, the remainder of Reader 60 is provided.

The WHL, GNL, and BKL signals from Color Detector Circuit 68 are also applied to a Beginning Of Field (BOF) Counter Means 90, and End Of Field (EOF) Counter Means 92 and Transition Detector Means 94. BOF Counter Means 90 counts the time the WHL signal is logic 0 and compares this time to the time the next GNL or BKL signal is logic 0. If it turns out that the GNL or BKL signal time is less than one fourth the WHL signal time, the BOF signal becomes a logic 1. This indicates that a transition from the white background color to the first bar has occurred. Similarly, EOF Counter Means 92 counts the time a BKL or a GNL signal is logic 0 and compares this time to the time the immediately subsequent WHL signal (if any) is logic 0. If the WHL signal is logic 0 four times as long as the previous GNL or BKL signal, the EOF signal becomes logic 1. This indicates that the last transition of the data field has occurred.

Every time a color transition occurs and a DATAIN bit is provided, Transition Detector Means 94 provides an LDNB signal and a TRANSTB7 signal, and these signals are applied to BC8 Counter Means 96. The LDNB signal is also applied to Input Buffer Means 72 to enable the DATAIN bit to be applied thereto. BC8 Counter Means 96 increments its count from one to eight each time the LDNB signal occurs and the count therein at any time equals the number of bits stored in Input Buffer Means 72.

In addition to BC8 Counter Means 96, four other counters are included in Reader 60. These are Register Position Counter Means 98, Index Register Counter Means 100, Limit Register Counter Means 102, and Gross Time Out (GTO) Counter Means 104. Register Position Counter Means 98 is a free-running counter which continually counts from one to 17. It is used to keep track of the information in Main Buffer Means 74. Index Register Counter Means 100 works in conjunction with Register Position Counter Means 98 to load and unload data into and out of Main Buffer Means 74. It is incremented by each BC8 pulse provided from BC8 Counter Means 96. Limit Register Counter Means 102 is used in conjunction with Index Register Counter Means 100 to compare the length of the data, to add four dummy bits into Input Buffer Means 72, and to detect the end of data. It is used in conjunction with Register Position Counter Means 98 to detect the end of message and initiate the parity check. The size code from Output Buffer Means 86 is applied to Limit Register Counter Means 102 and stored therein for future reference. GTO Counter Means 104 is a switchable counter which provides a PENUP signal either if probe 62 scans the same color for either one fourth of a second or one second, depending upon whether a color bar, or area 25, shown in FIGS. 1B and 2B, is being scanned. It is incremented by the RSTRPC signal provided from Register Position Counter Means 98 and reset by each TRANSTB7 pulse from Transition Detector Means 94. The PENUP signal is provided one fourth of a second after the last transition in case a bar is being scanned and after one second in case area 25 of a double field tag is being scanned. The switchability of GTO Counter Means 104 is controlled by the size code and the ID code in the first scanned data field.

Register Position Counter and Index Register Counter (R. P. C. and I. R. C.) Compare Means 106 provides an eight-bit-long RGIXCP signal every time the count in Register Position Counter Means 98 equals the count in Index Register Counter Means 100. This signal allows the data transfer between Input Buffer Means 72 and Main Buffer Means 74 and between Main Buffer Means 74 and Output Buffer Means 86. Register Position Counter and Limit Register Counter (RPC & LRC) Compare Means 108 provides an RGLRCP pulse signal whenever the count in Register Position Counter Means 98 equals the count in Limit Register Counter Means 102. Limit Register Counter and Index Register Counter (LRC & IRC) Compare Means 110 provides an LRIXCP signal whenever the count in Limit Register Counter Means 102 equals the count in Index Register Position Counter Means 98.

After the entire data field has been scanned, it is necessary to provide an End Of Data (EOD) signal. This signal is provided after two size code checks have been performed by Size Code Check Means 112. The first size code check is comparing the first size code detected with the second size code detected and is accomplished as follows. After the first eight bits are detected and stored in Input Buffer Means 72, they are transferred to both Main Buffer Means 74 and Output Buffer Means 86, causing the first detected size code to be stored in Output Buffer Means 86. After the last data bit is detected from the tag and the EOF signal becomes logic 1, the second detected size code is in Input Buffer Means 72. At this time, the size codes in both Input Buffer Means 72 and Output Buffer Means 86 are applied to Size Code Check Means 112 as the OBD and IBB8 signals and compared with one another. The second size code check is performed by also applying the OBD signal to Limit Register Counter Means 102, so that the size code is also stored therein. It should be noted that at this time (after the EOF signal) the count in Index Register Counter Means 100 will be one less than the total number of eight-bit characters detected, since the last detected character is still in Input Buffer Means 72 and the count in Limit Register Counter 102 reflects the size code number, which is two less than the total number of eight-bit characters scanned. If the front and back size codes properly compare in Size Code Check Means 112, the count in Limit Register Counter Means 102 is increased by two, and the count in Index Register Counter Means 100 is increased by one. If all bits of the code have been detected, this should make the count in Index Register Counter Means 100 equal the count in Limit Register Counter Means 102, thereby causing the LRIXCP signal to become a logic 1. When the RGIXCP signal becomes logic 1, the EOD signal will become logic 1, indicating that the two size code checks have been successfully completed.

If one or both of the two size code checks are unsuccessful, it is still desirable for the EOD signal to become logic 1. This will occur after the GTO counter 104 provides the logic 1 PENUP signal, due to probe 64 remaining on white background area 56 in FIG. 3.

After the size code has been checked, the B. C. C. and MOD3 parity of the captured data is checked. The EOD signal is applied to Parity Loop Control Logic 114 and causes the SCPYOT signal and the PTYSEQ signal to be set to logic 1. The SCPYOT signal is applied to Character Pulse Generator Means 116 and sets the CHPLOT signal for one character time (eight bit times). This causes Index Register Counter Means 100 to be set to a count of one, and, when Register Position Counter Means 98 has a count of one, the RGIXCP signal becomes logic 1 for one character time. This clears Index Register Counter Means 100 and causes the first eight control bits stored in the first position of Main Buffer Means 74 to be shifted into Output Buffer Means 86. The size code in these eight bits is then shifted to Limit Register Counter Means 102, and two is added to the count in Limit Register Counter Means 100, so that the count therein corresponds to the number of characters in Main Buffer Means 74.

At this time, the PYCKFF signal is set to logic 1, and resets the SCPYOT signal and causes the CHPLOT signal from Character Pulse Generator Means 116 to be set for one character time. This, in turn, causes a count of one to be placed in Index Register Counter Means 100, and the RGIXCP signal becomes logic 1 when the count in Register Position Counter Means 98 becomes one. Now the RGIXCP signal is held at logic 1 until the count in Register Position Counter Means 98 matches the count in Limit Register Counter Means 108; that is, until the RGLRCP signal becomes logic 1. During this time, all of the bits in Main Buffer Means 74 are shifted through Parity Check Logic Means 118, and the B. C. C. and MOD3 parity of the data stored in Main Buffer Means 74 is checked. If the parity check is successful, then the PYCKFF and PTYSEQ signals are reset to logic 0.

At this time, the data has been completely checked and is ready to be transmitted to Utilization Device 89. After the PTYSEQ signal is reset, the SCDTOT signal from Data Loop Logic Means 120 is set. This signal sets the CHPLOT signal to logic 1 for one character time and causes a count of one to be placed in Index Register Counter Means 100. When the next RGIXCP signal occurs, the first character in Main Buffer Means 74 is shifted into Output Buffer Means 86, and the size code portion thereof is placed in Limit Register Counter Means 102. Then the DATAOT signal becomes logic 1, and the data transfer commences.

If the tag had been scanned in the forward direction, the CHPLOT signal is set for two character times, causing a count of two to be placed in Index Register Counter Means 100. When the RGIXCP signal becomes logic 1, the first eight-bit character of true data is shifted from position two in Main Buffer Means 74 to Output Buffer Means 86. Upon command of Utilization Device 89, the data in Output Buffer Means 86 is then right shifted and transmitted through Interface Means 88 to Utilization Device 89. During this time, Index Register Counter Means 100 is incremented by one, and, upon the next logic 1 RGIXCP signal, the next eight bits of data are transferred to Output Buffer Means 86. This sequence continues until the count in Index Register Counter Means 100 equals the count in Limit Register Counter Means 102. Then, when the last data character is sent to Output Buffer Means 86, the LRIXCP signal becomes logic 1 and indicates that no more data is to be sent.

If the tag had been scanned in the reverse direction, the data stored in Main Buffer Means 74 would have been stored in opposite order and complementary to the data which is to be sent to Utilization Device 89. In this case, the SCDTOT signal causes the size code to additionally be loaded into Down Counter 122. Whenever the count in Down Counter 122 is fifteen or less, a one-character-long DWINSP signal is produced, and this signal is applied through CHPLOT control gate 124 to provide a logic 1 FDBKDOT signal, since the REVDAT signal is true for a reverse scan. The FDBKDOT logic 1 signal sets the CHPLOT signal, which remains logic 1 for N+1 character times, where N is the size code. For each character time the CHPLOT signal is logic 1, a count of one is subtracted from the count in Down Counter 122, and a count of one is added to the count in Index Register Counter Means 100. Further, for every character time after four that the CHPLOT signal is logic 1, a count of one is subtracted from the count in Limit Register Counter Means 102. Thus, when the CHPLOT signal returns to logic 0 after N+1 character times, Limit Register Counter Means 102 has a count of three, Index Register Counter Means 100 has a count of N+1, and Down Counter 122 has a count of zero. The count of three in Limit Register Counter Means 102 is the position in Main Buffer Means 74 of the least significant character of data, and the N+1 count in Index Register Counter Means 100 is the position in Main Buffer Means 74 of the most significant character of data. Special logic is also provided for situations when the size code is three or two, and this is described in detail hereinafter. When the RGIXCP signal becomes logic 1, the most significant character of data is transferred from Main Buffer Means 74 to Output Buffer Means 86. This is the same data that would be first transferred if a forward scan occurred, except that it is in opposite order and complementary thereto. This data is complemented and left shifted out of Output Buffer Means 86 and transmitted through Interface Means 88 to Utilization Device 89, and a count of One is subtracted from the count in Index Register Counter Means 100.

The above procedure repeats itself until the count in Index Register Counter Means 100 matches the count in Limit Register Counter Means 102, at which time the LRIYCP signal becomes logic 1, indicating that the last character is being transferred from Main Buffer Means 74 to Output Buffer Means 86 and the entire message has been read from Main Buffer Means 74.

For a complete understanding of the reading apparatus of FIG. 5 and of the present invention which is embodied in such reading system, U.S. Patent application, Serial No. 205,543, filed December 7, 1971, now U.S. Patent No. 3,717,750, issued February 20, 1973, entitled "Input Control Logic for a Code Reading System" by Robert C. Gilberg, James P. Donohue, and Ramesh S. Patel and assigned to the assignee of the present invention is hereby incorporated by reference herein and made a part of the instant application. More particularly, FIGS. 14A through 14L of the drawings and column 13, line 2 through column 87, line 26, are referred to as being pertinent to the invention claimed herein.

What is claimed is:

1. In a code reading system in which scanning means scans a coded medium along a given path that includes a plurality of contiguous detectable indicia arranged in a coded format, each indicia having one of at least three detectably different characteristics, said code being defined by transitions from an indicium of one characteristic to an indicium of a different characteristic, the first detected and last detected indicium having the same characteristic and being detected for a longer amount of time than the remaining indicia, said scanning means providing one of a first, a second, or a third indicium signal whenever said scanning means scans an indicium having a respective one of a first, a second or a third detectably different characteristic, logic for determining when said plurality of indicia are being scanned comprising:

means responsive to said first, second and third indicium signals to determine the amount of time each of said indicia is detected, said means including a first counter means and a second counter means, said first counter means being reset to a zero count upon the occurrence of said first indicium signal and said second counter means being reset to zero upon the occurrence of either said second indicium signal or said third indicium signal, said first and second counter means, after being reset to zero count, counting as long as the indicium signal causing them to be reset is provided, the counts of said first and second counter means being operated upon after the signal provided by said scanning means changes, said counter means thereafter counting;

means responsive to the count of said first counter means for providing a first signal whenever the amount of time for detecting a certain indicium is a certain amount less than the amount of time for detecting the immediately preceding indicium; and means responsive to the count of said second counter means for providing a second signal whenever the amount of time for detecting a second certain indicium is a certain amount greater than the amount of time for detecting the immediately preceding indicium.

2. This invention according to claim 1 wherein said first signal is provided in response to the count in said first counter when the next following scanning means indicium signal change occurs, and said second signal is provided when the count of said second counter reaches a given value.

3. The invention according to claim 1
wherein the count in said first counter is operated upon by dividing it by a given amount and inverting it; and
wherein said first signal is provided at the point in time said next following scanning means indicium signal change occurs as long as said counter is not saturated.

4. The invention according to claim 3 wherein said count in said first counter is divided by four.

5. The invention according to claim 1
wherein the count in said second counter is operated upon by being inverted;
wherein said second counter thereafter counts up at a slower rate than prior to said count being operated upon; and
wherein said second signal is provided when said second counter becomes saturated.

6. The invention according to claim 5 wherein said slower rate is one fourth of the prior counting rate.

7. In combination:
an encoded medium on which is positioned a series of contiguous color bars of first, second and third colors, said medium having a background area of said first color, there being a path on said medium traversing said series of bars and a portion of said background area on each side of said series of bars, the background area on each side of said series of bars traversed by said path being wider than the width of said bars along said path;
detecting means for being scanned along said path and for providing one of a first, second, or a third signal whenever respective first, second or third colors are scanned;
first counter means responsive to said first, second, and third signals capable of counting between first and second values, said first counter means including means for resetting said first counter means to said first value upon the occurrence of said first signal, said first counter means thereafter counting towards said second value, said first counter means further including means for dividing the then existing count thereof by a given value and complementing said divided value at the time one of said second or third signals occur following the occurrence of said first signal, said first counter means thereafter counting towards said second value;
first decoding means for providing a beginning signal after said one of said second or third signals no longer is provided in the event said first counter means has not counted past a third value which is between said first and second values;
second counter means responsive to said first, second and third signals capable of counting between fourth and fifth values, said second counter means including means for resetting said second counter means to said fourth value upon the occurrence of said second or said third signals said second counter means thereafter counting towards said fifth value at a given rate, said resetting means further resetting the count of said second counter means to the complement of the then-existing count thereof upon the occurrence of said first signal, said second counter means thereafter counting towards said fifth value at a second rate, which is less than said given rate; and
second decoding means for providing an ending signal when the count of said second counter reaches said fifth value.

8. The invention according to claim 7;
wherein said first value is zero;
wherein said second value is two to the nth power; and
wherein said third value is two to the n minus two power.

9. The invention according to claim 8;
wherein said given value is four; and
wherein said detecting means detects said background area on each side of said bars for at least four times as long as any bar is detected.

10. The invention according to claim 7:
wherein said fourth value is zero;
wherein said fifth value is two to the nth power;
wherein said second rate is one fourth of said given rate; and
wherein said detecting means detects said background area on each side of said bars for at least four times as long as any bar is detected.

11. The invention according to claim 10:
wherein said first value is zero;
wherein said second value is two to the n plus one power;
wherein said third value is two to the n minus one power; and
wherein said given value is four.

* * * * *